United States Patent
Zhang et al.

(10) Patent No.: US 11,143,928 B2
(45) Date of Patent: Oct. 12, 2021

(54) LIGHT VALVE USING MODIFIED POSS COMPOUND

(71) Applicant: ZHEJIANG JINGYI NEW MATERIAL TECHNOLOGY CO. LTD, Zhejiang (CN)

(72) Inventors: Dawei Zhang, Lachine (CA); Yanan Li, Montreal (CA); Shiyong Zhao, Longueuil (CA); Shuyong Xiao, St-Laurent (CA)

(73) Assignee: ZHEJIANG JINGYI NEW MATERIAL TECHNOLOGY CO. LTD, Zhejiang (CN)

( * ) Notice: Subject to any disclaimer, the term of this patent is extended or adjusted under 35 U.S.C. 154(b) by 0 days.

(21) Appl. No.: 17/010,787

(22) Filed: Sep. 2, 2020

(65) Prior Publication Data

US 2020/0409224 A1    Dec. 31, 2020

Related U.S. Application Data

(63) Continuation-in-part of application No. 16/047,146, filed on Jul. 27, 2018, now abandoned.

(51) Int. Cl.
| | |
|---|---|
| *C08J 3/28* | (2006.01) |
| *G02F 1/153* | (2006.01) |
| *C08G 77/04* | (2006.01) |
| *G02F 1/1516* | (2019.01) |

(52) U.S. Cl.
CPC ......... *G02F 1/1533* (2013.01); *C08G 77/045* (2013.01); *C08J 3/28* (2013.01); *G02F 1/15165* (2019.01); *C08J 2383/04* (2013.01)

(58) Field of Classification Search
CPC . C08J 2383/06; C08J 3/24; C08J 3/28; C08G 77/045; C08G 77/04; G02F 1/0009; G02F 1/0102; G02F 1/153; G02F 1/1533; G02F 1/15165
See application file for complete search history.

(56) References Cited

U.S. PATENT DOCUMENTS

| | | | | |
|---|---|---|---|---|
| 5,484,867 A | * | 1/1996 | Lichtenhan | C08G 77/04 525/474 |
| 9,260,571 B2 | * | 2/2016 | Lewicki | C08G 77/38 |
| 2008/0279797 A1 | * | 11/2008 | Maitra | A61K 31/80 424/64 |

OTHER PUBLICATIONS

Zhang, Journal of Applied Polymer Science, 2015, vol. 132, Issue 27, p. 42187(1)-42187(8) (Year: 2015).*
Chen, Polymer Degradation and Stability, 95 (2010) p. 618-626 (Year: 2010).*

* cited by examiner

*Primary Examiner* — Robert C Boyle
(74) *Attorney, Agent, or Firm* — Yue (Robert) Xu; Apex Attorneys at Law, LLP

(57) ABSTRACT

Provided herein is a modified Polyhedral Oligomeric Silsesquioxane (POSS) compound and a light valve device using the modified POSS compound. The modified POSS compound is a liquid compound synthesized via hydroxyl condensation among a component I, a component II and a component III; wherein the component I is a POSS monomer having at least one hydroxyl; the component II is a dihydroxyl-terminated crosslinkable monomer or oligomer; the component III is a dihydroxyl-terminated non-crosslinkable monomer or oligomer. The light valve device being capable of electronically changing its light transmittance is made by sandwiching a light control layer between two transparent electroconductive substrate layers. The light control layer is made by a solid polymeric matrix containing modified POSS compound. The solid polymeric matrix is formed by solidifying of a modified POSS compound under ultraviolet irradiation or heating.

9 Claims, No Drawings

LIGHT VALVE USING MODIFIED POSS COMPOUND

CROSS REFERENCE TO RELATED APPLICATIONS

This application is a continuation of U.S. patent application Ser. No. 16/047,146, filed on Jul. 27, 2018, titled with "HYBRID ORGANIC-INORGANIC POLYMERIC MATRIX IN LIGHT VALVE DEVICES AND METHOD FOR MAKING THE SAME", and the disclosures of which are hereby incorporated by reference.

FIELD OF THE INVENTION

The present invention is directed to a modified Polyhedral Oligomeric Silsesquioxane (POSS) compound, a method for making the same and use thereof of making a light valve device.

BACKGROUND ART

Technically, light valve is a device which can regulate the amount of light passing through a media like a water valve controlling the water flow. Window shade can be viewed as a light valve too. But in this invention, the light valve is referred a device which can electronically control the light transmittance, and such a device is scientifically referred as an electrochromic device. Depending on science behind an electrochromic device, it can be further classified as polymer dispersed liquid crystal (PDLC) (U.S. Pat. No. 3,585,381), electrochemical device (EC) (U.S. Pat. No. 9,581,877) and suspension particle display (SPD) (U.S. Pat. No. 6,606,185). Specifically, a light valve is a device that can electronically change its light transmittance via a change of applied AC voltage. This device can be used in many filed like architectural glass, car window, displayer.

In the case of suspension particle display (SPD), the theory of it was first published before 1940. This theory can make small particles that must work in a liquid applying in solid device. A typical SPD is made by sandwiching a light control layer between transparent electroconductive substrate layers, referred as transparent electrodes. The light control layer is generally obtained by dispersing a light control suspension which contains light control particles into a resin matrix, wherein the light control particles respond to an electric field. More specifically in this kind of light valve, the light control particles absorb, scatter or reflect light by Brownian motion in the state that no electric field is applied thereto; thus, incident light into the film cannot penetrate through the film. When an electric field is applied thereto, the light control particles are oriented in the direction parallel to the electric field by the polarization of the particles; thus, incident light to the film can penetrate through the film. Therefore, in such a light valve, the amount of transmitted light is adjusted in accordance with the response of light control particles to an electric field.

Structurally, the light control layer of SPD light valve is typically a polymeric matrix in solid form which contains evenly dispersed droplets of the light control suspension in liquid form, and inside these droplets the light control particles are embedded. To obtain the evenly-dispersed droplets in solid polymeric matrix, the solid polymeric matrix must be formed by solidifying of a liquid polymer. Thus an emulsion containing liquid polymer, light control suspension and initiator are formulated such that this emulsion can be coated onto a transparent electrode by tradition coating methods including doctor-blade coating, screen printing, slot-die coating, and then the wet coated layer is subsequently solidified (or named cured) by heating or exposure to a ultraviolet (UV) irradiation.

Although this light valve in a film form (referred as LV Film) has been successfully developed for many years, some notable deficiencies have been limited its wide deployment in commercial applications. One of these notable deficiencies is that the cured polymeric matrix film bonds insufficiently strong to the transparent electrodes such as an ITO/PET substrate layer, and as such the device can be subjected to loss of its structure integral due to peeling, bending, folding, and friction. The U.S. Pat. No. 7,791,788 disclosed that addition of (3-glycidoxypropyl) methyl dimethoxy silane into a polymeric matrix can improve the adhesion between the cured polymeric matrix and transparent electrodes, but the obtained result was not satisfactory. A second deficiency is that the LV films disclosed in prior arts generally lack sufficient moisture resistance. When these LV films are exposed to a high humidity environment, the color of films would fade quickly because water can degrade or even destroy nano-structure of light control particles, and evenly cause the dis-function of LV films. Thirdly, the residual of initiator remained inside the cured LV films presents another potential danger to the stability of the LV film, and indeed a LV film of high concentration of initiator residue can turn red when it is exposed to the sun light for certain period, and even worse for these LV films without UV-protection layer.

Therefore, it is highly desirable to develop a LV film in which the solid polymeric matrix is capable of bonding better onto the selected transparent electrodes, capable of providing better moisture resistance to protect light control particles, and with less amount of initiator residue. This is the objective of the present invention.

SUMMARY OF THE INVENTION

In view of above, an object of the present invention is providing a modified POSS compound, a method for making the same and use thereof of making a light valve device.

The present invention provides a modified POSS compound as shown in Structure 1, $$\text{POSS-(O—P)}_m \hfill \text{(Structure 1)}$$

which is synthesized via hydroxyl condensation among component I, component II and component III.

Preferably, the component I is a POSS monomer having at least one hydroxyl as shown in Structure 2.

$$\text{POSS-(OH)}_n \hfill \text{(Structure 2)}$$

Preferably, component I has a structure selected from the group consisting of Structure 3, Structure 4, Structure 5 and Structure 6,

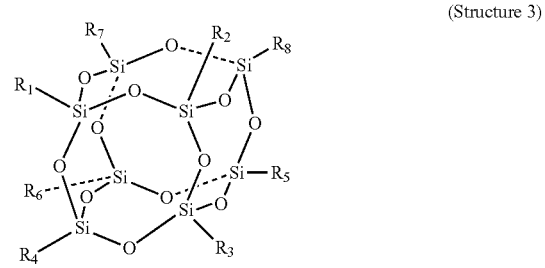

(Structure 3)

wherein $R_1$ to $R_8$ are substituents independently selected from halogen atom, and saturated or unsaturated hydrocarbons, and at least one of $R_1$ to $R_8$ is a hydroxyl;

(Structure 4)

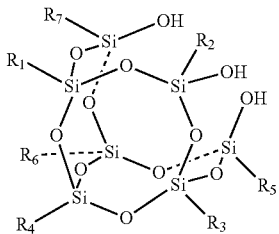

wherein $R_1$ to $R_7$ are substituents independently selected from hydroxyl, halogen atom, and saturated or unsaturated hydrocarbons;

(Structure 5)

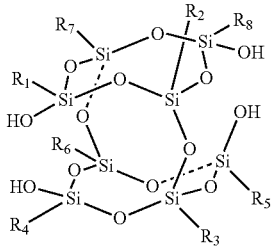

wherein $R_1$ to $R_8$ are substituents independently selected from hydroxyl, halogen atom, and saturated or unsaturated hydrocarbons;

(Structure 6)

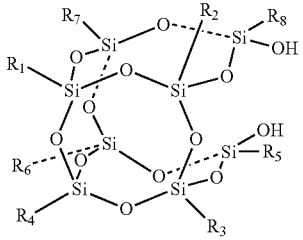

wherein $R_1$ to $R_8$ are substituents independently selected from hydroxyl, halogen atom, and saturated or unsaturated hydrocarbons.

Preferably, the component II is a crosslinkable dihydroxyl-terminated silicon-containing monomer or oligomer; the component III is a dihydroxyl-terminated silicon-containing non-crosslinkable monomer or oligomer; and P is a linear chain formed by a number of the component II and a number of the component III, wherein the number of the component II is j, and the number of the component III is k, and j is an integer from 1 to 20, k is an integer from 1 to 50, n is an integer from 1 to 12, and m is an integer from 1 to 12. In the linear chain structure P, the sequence of component II and component III is not specifically limited.

Preferably, the component II has a structure of

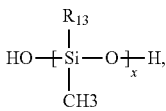

and $R_{13}$ is crosslinkable substituents selected from alkenyl groups, x is an integer from 1 to 10.

Preferably, the component III has a structure of

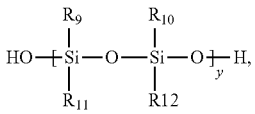

and $R_9$ to $R_{12}$ are non-crosslinkable substituents independently selected from alkyl groups and aryl groups, and y is an integer from 1 to 10.

Preferably, the modified POSS compound is a liquid compound at room temperature.

The present invention further provides a light valve device being capable of electronically changing light transmittance, which has a sandwich structure comprising two transparent electroconductive substrate layers and a light control layer therebetween, wherein the light control layer comprises solid polymeric matrix, in the solid polymeric matrix, liquid droplets are dispersed, and inside the liquid droplets light control particles are embedded; and the solid polymeric matrix is formed by solidifying of a modified POSS compound under ultraviolet irradiation or heating, wherein the modified POSS compound is shown in Structure 1.

POSS-(O—P)$_m$  (Structure 1)

Preferably, the solid polymeric matrix comprising dispersed liquid droplets in which light control particles are suspended. The liquid droplets consist of insulating organic oil and light control particles. Preferably, the insulating organic oil is selected from the group consisting of mineral insulating oils such as transformer oil; synthetic insulating oils such as silicone oils, fluorocarbon, plastifiers (dioctyl phthalate, dibutyl phthalate, diisooctyl phthalate and triisodecyl triphenate (TDTM)), dodecylbenzene, polybutene oils; and plant oils such as castor oil, soybean oil, canola oil.

Preferably, the transparent electroconductive substrate layers are selected from a group consisting of ITO glass, ITO/PET film, sliver nanowire/PET film and copper nanowire/PET film.

Provided herein is a modified POSS compound and use thereof of making a light valve device. The modified POSS compound is a liquid compound synthesized via hydroxyl condensation among a component I, a component II and a component III; wherein the component I is a POSS monomer having at least one hydroxyl; the component II is a dihydroxyl-terminated crosslinkable monomer or oligomer; the component III is a dihydroxyl-terminated non-crosslinkable monomer or oligomer. The light valve device being capable of electronically changing its light transmittance is made by sandwiching a light control layer between two transparent electroconductive substrate layers. The light control layer is made by a solid polymeric matrix containing POSS. The solid polymeric matrix containing POSS is formed by solidifying a liquid containing the modified POSS compound under ultraviolet irradiation or heating.

By using the modified POSS compound, the following advantageous effects can be obtained:
1) the solid polymeric matrix containing the modified POSS compound has a bonding strength of over 2.7 N/m; and
2) the light valve device obtained in the present invention has better moisture resistance, and is more stable than those without the modified POSS compound of the prior art.

DETAILED DESCRIPTION OF CERTAIN PREFERRED EMBODIMENTS

The present invention provides a light valve device being capable of electronically changing light transmittance, which has a sandwich structure comprising two transparent electroconductive substrate layers and a light control layer therebetween, wherein the light control layer comprises solid polymeric matrix, in the solid polymeric matrix, liquid droplets are dispersed, and inside the liquid droplets light control particles are embedded; and the solid polymeric matrix is formed by solidifying of a modified POSS compound under ultraviolet irradiation or heating.

Preferably, the present invention provides a modified POSS compound as shown in Structure 1,

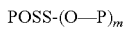  (Structure 1)

which is synthesized via hydroxyl condensation among component I, component II and component III;

wherein the component I is a POSS monomer having at least one hydroxyl as shown in Structure 2;

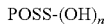  (Structure 2)

the component II is a crosslinkable dihydroxyl-terminated silicon-containing monomer or oligomer; the component III is a dihydroxyl-terminated silicon-containing non-crosslinkable monomer or oligomer;

P is a linear chain formed by a number of the component II and a number of the component III, wherein the number of the component II is j, and the number of the component III is k;

j is an integer from 1 to 20, k is an integer from 1 to 50, n is an integer from 1 to 12, and m is an integer from 1 to 12;

component I has a structure selected from the group consisting of Structure 3, Structure 4, Structure 5 and Structure 6,

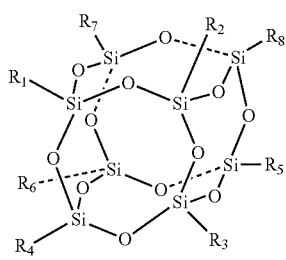  (Structure 3)

wherein $R_1$ to $R_8$ are substituents independently selected from halogen atoms, and saturated or unsaturated hydrocarbons, and at least one of $R_1$ to $R_8$ is a hydroxyl;

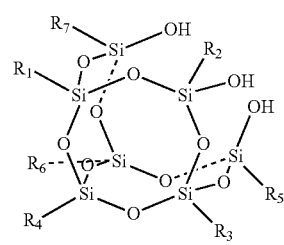  (Structure 4)

wherein $R_1$ to $R_7$ are substituents independently selected from hydroxyl, halogen atoms, and saturated or unsaturated hydrocarbons;

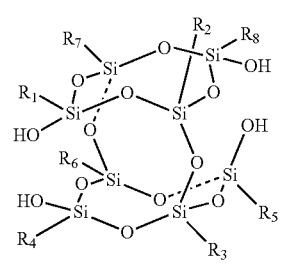  (Structure 5)

wherein $R_1$ to $R_8$ are substituents independently selected from hydroxyl, halogen atoms, and saturated or unsaturated hydrocarbons;

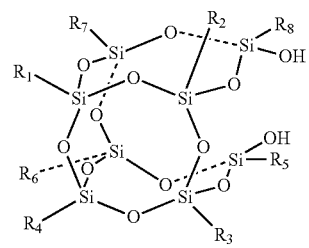  (Structure 6)

wherein $R_1$ to $R_8$ are substituents independently selected from hydroxyl, halogen atoms, and saturated or unsaturated hydrocarbons.

The R1 to R8 are substituents having at least one hydroxyl which is used for hydroxyl condensation and others are independently selected from halogen atom, saturated or unsaturated hydrocarbons. The saturated or unsaturated hydrocarbons may generally be selected from hydrocarbon groups having typically from 1 to 20 carbon atoms. Examples of alkyl groups include methyl, ethyl, propyl, butyl, pentyl, hexyl, heptyl, octyl, cyclopentyl. It may also include alkenyl group such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom.

For example, trisilanolethyl POSS as exampled in Structure 7 is a common used POSS compound, and it is used in several examples like Example 2 to 4 in this invention. The POSS which have similar structure depicted in Structure 8 to 11 are also used in synthesis like Example 5 to 8.

(Structure 7)

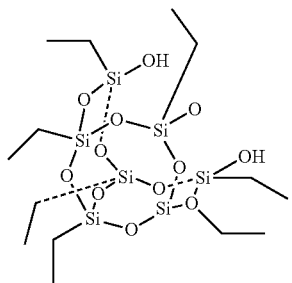

(Structure 8)

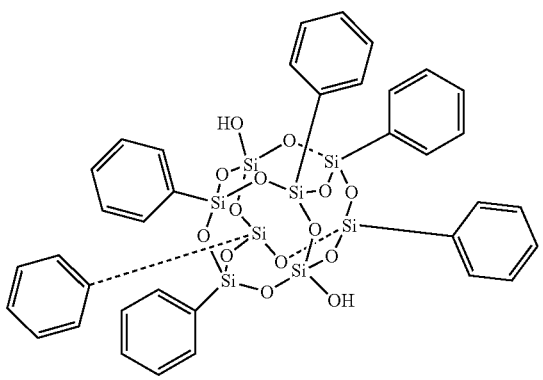

(Structure 9)

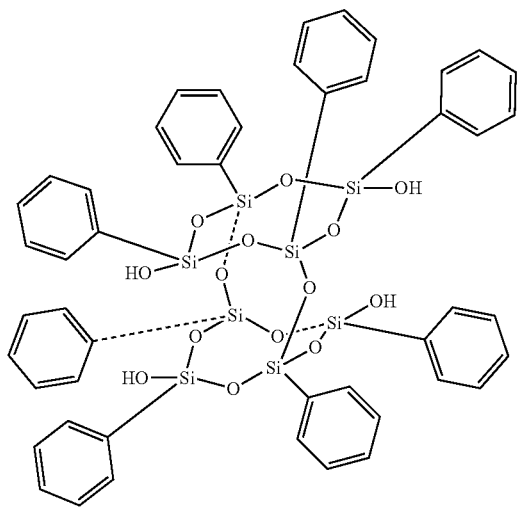

(Structure 10)

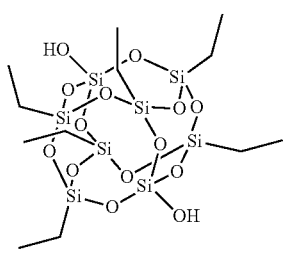

-continued (Structure 11)

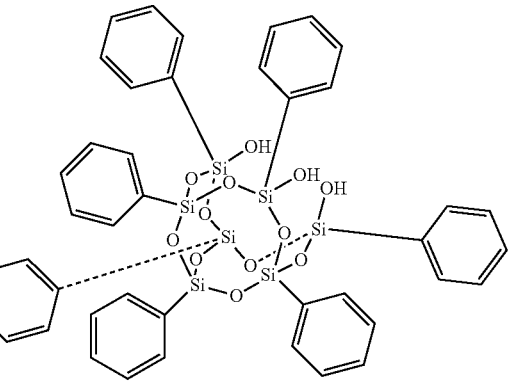

In Structure 1 of the present invention, P is a linear chain formed by a number of the component II and a number of the component III, wherein the number of the component II is j, and the number of the component III is k; j is an integer from 1 to 20, k is an integer from 1 to 50, n is an integer from 1 to 12, and m is an integer from 1 to 12.

In the present invention, the component II has a following structure

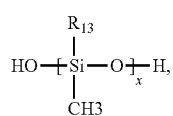

$R_{13}$ is crosslinkable substituents selected from alkenyl such as vinyl, allyl, hexenyl, heptenyl and octenyl; and x is an integer from 1 to 10.

In the present invention, the component III has a following structure

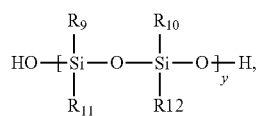

wherein the substituents $R_9$-$R_{12}$ is selected from alkyl groups (such as methyl, ethyl, propyl, butyl, pentyl, hexyl, heptyl, octyl, cyclopentyl), and aryl groups (such as phenyl, alkylphenyl and alkoxyphenyl); and y is an integer from 1 to 10;

In the linear chain structure P, the sequence of component II and component III is not specifically limited. The linear chain P may have, but is not limited to, one of the following structures:

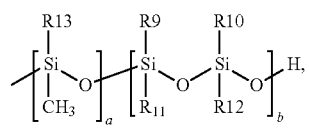

(Structure 12, a is an integer from 1 to 200, b is an integer from 1 to 500)

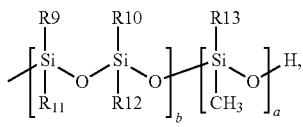

(Structure 13, a is an integer from 1 to 200, b is an integer from 1 to 500)

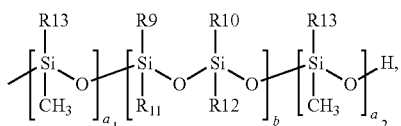

(Structure 14, $a_1$ and $a_2$ are independently an integer from 1 to 200, and $a_1+a_2 \leq 200$; and b is an integer from 1 to 500)

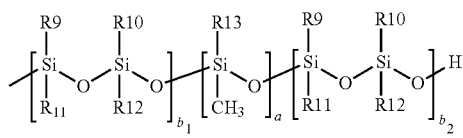

(Structure 15, a is an integer from 1 to 200; and $b_1$ and $b_2$ are independently an integer 1 to 500, and $b_1+b_2 \leq 500$.)

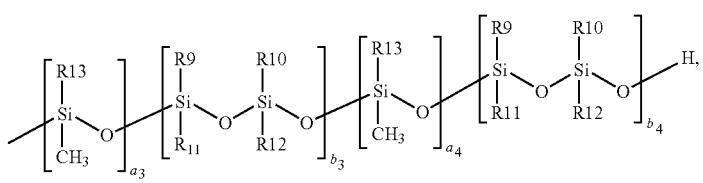

(Structure 16, $a_3$ and $a_4$ are independently an integer from 1 to 200, and $a_3+a_4 \leq 200$; and $b_3$ and $b_4$ are independently an integer 1 to 500, and $b_3+b_4 \leq 500$.)

(Structure 17

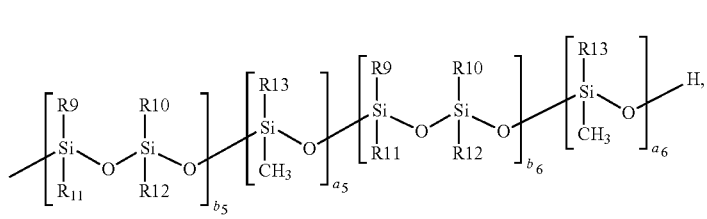

$a_5$ and $a_6$ are independently an integer from 1 to 200, and $a_5+a_6 \leq 200$; and $b_5$ and $b_6$ are independently an integer 1 to 500, and $b_5+b_6 \leq 500$)

and

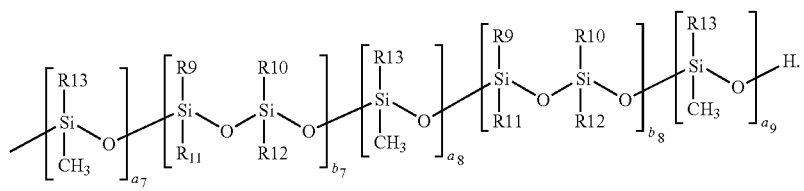

(Structure 18, $a_7$, $a_8$ and $a_9$ are independently an integer from 1 to 200, and $a_7+a_8+a_9 \leq 200$; and $b_7$ and $b_8$ are independently an integer 1 to 500, and $b_7+b_8 \leq 500$.)

In Structures 12-18, terms such as "a", "b", "$a_1$", "$b_1$", etc., independently represents for the number of the blocks in the structure, and the "a" and "b" in different structures do not have to be the same.

The said modified POSS compound is synthesized via hydroxyl condensation among component I and component II and component III. Specifically, the method for preparing the modified POSS compound comprises the following steps.

a. Dissolve component I in an organic solvent to prepare a component I solution; add a component III and the configured component I solution to a reactor. The reactor connected with a water separator to the condenser, mechanical stirring is added, and a thermometer is placed; the solution in the reactor is heated to reflux, when a small amount of water appears in the water trap, add tin-containing catalyst solution; then the component II is added dropwise; then the condensation reaction is carried out, and the reaction temperature is controlled. End of reaction, then the reaction solution is quickly cooled to room temperature.

b. Mix ethanol and the cooled reaction solution in a beaker, then wash the reaction flask with an organic solvent, and pour the cleaning solution into the beaker together. After mixing, add methanol and stir, where ethanol:methanol. The ratio of is 1:1-10; then the mixed solution is introduced into the separatory funnel, and stratification occurs after a few hours of standing. The lower clear liquid is taken out and rotated at 70 to 120 degrees Celsius to obtain the liquid containing the modified POSS compound.

Preferably, the component I:component II:component III: tin-containing catalyst:organic solvent has a mass ratio of (0.01~0.2):(0.01~0.5):1:(0.001~0.01):(3~10), the specific preparation steps are as follows:

Preferably, the organic solvent is at least one of hexane, heptane, octane, and toluene is used as a solvent.

Preferably, the tin-containing catalyst is at least one of tin(II) 2-ethylhexanoate, dibutyltin dilaurate, dibutyltin diacetate, dioctyltin dilaurate.

The said liquid droplets contain light control particles and insulating organic oil which is at least one of the mineral insulating oil such as transformer oil; synthetic insulating oil such as silicone oil, fluorocarbon, plastifier (dioctyl phthalate, dibutyl phthalate, diisooctyl phthalate and triisodecyl triphenate (TDTM)), dodecylbenzene, polybutene oil; plant oil such as castor oil, soybean oil, canola oil.

Light control particles are formed by titanium dioxide; dicarboxylate pyrazine; alkali halide such as calcium iodide, barium iodide, calcium bromide and barium bromide; and cellulose such as nitrocellulose, cellulose acetate and ethyl cellulose. The said light control particles respond to an electric field.

Hereafter, the following experimental examples are provided only for the purpose of illustrating the invention, and not to be constructed as limiting the invention in any manner. Example 1 below is based on a prior art method of synthesizing the liquid polymer. The rest examples are directly related to the invention. In all these examples, all parts and percentages are by weight unless otherwise noted. The key component in making the said liquid is a family of POSS materials which are purchased from Hybrid Plastic, Inc., and all other chemicals are purchased from Sigma-Aldrich company unless otherwise specified.

Example 1

Synthesis of Siloxane Polymeric Matrix

Into a 500 ml, 3-neck round bottom flask was weighted 45 g of disilanol-terminated dimethyl diphenyl siloxane copolymer, 5 g of 3-acryloxypropylmethyl dimethoxysilane, 1 g of (3-glycidoxy propyl) methyl dimethoxysilane, and 200 ml of heptane. The flask was fitted with a Dean-Stark ("D-S") trap and through the second port a mechanical agitation device was installed. The third port on the flask was inserted a thermometer. The contents of the reaction flask were brought to reflux and allowed to reflux for 30 minutes without catalyst addition. Some condensation took place, as evidenced by the collection of water in the D-Strap. The catalyst, i.e., tin(H) 2-ethylhexanoate, (0.04 g) in 20 ml of heptane, was then introduced through a syringe into the flask. The reaction mixture was refluxed for additional 4 hours, and then cooled to room temperature for work-up.

Ina typical work-up procedure, 250 ml of ethanol was placed in a 1-liter beaker and the reaction mixture was added to the beaker. The reaction flask was further washed with 30 ml of heptane and the washed liquid was also combined into the beaker. The contents of the beaker were stirred well, and 250 mL of methanol was introduced while stirring. The contents of the beaker were stirred for about 15 minutes and then transferred into a separatory funnel. Layer separation occurred after a few hours. The bottom clear layer was collected and was finally rotary evaporated to yield the target siloxane polymeric matrix. In this example, total 32.4 g of the target siloxane polymeric matrix was obtained.

Example 2

Synthesis of a Modified POSS Compound 1

2.7 g trisilanolethyl POSS was dissolved into 190 ml heptane at first to prepare a POSS solution. Into a 500 ml, 3-neck round bottom flask was weighted 54 g of disilanol-terminated dimethyl diphenyl siloxane copolymer and then added the above prepared POSS-contained solution. The flask was fitted with a Dean-Stark ("D-S") trap and through the second port a mechanical agitation device was installed. The third port on the flask was inserted a thermometer. The contents of the reaction flask were subsequently heated to reflux for 30 minutes before addition of the catalyst (in this example, 0.13 g tin(II) 2-ethylhexanoate in 10 ml of heptane) by a syringe. After the addition of the catalyst, 3 g of 3-acryloxypropylmethyl dimethoxysilane were then slowly dropped into flask by a dropping funnel in a period of 10 minutes. The reaction mixture was refluxed for additional 5 hours, and then was cooled to room temperature for work-up.

Following the similar work-up procedure as that of Example 1, 250 ml of ethanol was placed in a 1-liter beaker and the cooled reaction mixture was added to the beaker and stirred. The reaction flask was washed with 30 ml of heptane and the washed liquid was also transferred to the beaker. The contents of the beaker were stirred well, and 200 mL of methanol was introduced while stirring. The contents of the beaker were stirred for about 15 minutes and transferred into a 1-liter separatory funnel. Layer separation occurred after a few hours. The bottom clear layer was collected and was finally rotary evaporated to yield a modified POSS compound 1. In this example, total 41.06 g of the modified POSS compound 1 was obtained.

Example 3

Synthesis of a Modified POSS Compound 2

Example 3 was followed the same procedure as Example 2, except 5.4 g trisilanolethyl POSS was used to replace 2.7 g trisilanolethyl POSS. Finally, 41.25 g of a modified POSS compound 2 was yielded.

Example 4

Synthesis of a Modified POSS Compound 3

Example 4 was followed the same procedure as Example 2, except 13.5 g trisilanolethyl POSS was used to replace 2.7 g trisilanolethyl POSS. Finally, 41.76 g of a modified POSS compound 3 was yielded.

Example 5

Synthesis of a Modified POSS Compound 4

Example 5 was followed the same procedure as Example 2, except 2.7 g of disilanolphenyl POSS was used to replace 2.7 g trisilanolethyl POSS. Finally, 43.12 g of a modified POSS compound 4 was obtained.

Example 6

Synthesis of a Modified POSS Compound 5

Example 6 was followed the same procedure as Example 2, except 2.7 g of terasilanolphenyl POSS was used to replace 2.7 g trisilanolethyl POSS. Finally, 40.53 g of a modified POSS compound 5 was obtained.

Example 7

Synthesis of a Modified POSS Compound 6

Example 7 was followed the same procedure as Example 2, except 2.7 g of disilanolethyl POSS was used to replace 2.7 g trisilanolethyl POSS. Finally, 40.48 g of a modified POSS compound 6 was obtained.

Example 8

Synthesis of a Modified POSS Compound 7

Example 8 was followed the same procedure as Example 2, except 2.7 g of trisilanolphenyl POSS was used to replace 2.7 g trisilanolethyl POSS. Finally, 41.13 g of a modified POSS compound 7 was obtained.

Example 9

Testing of Light Valve Device Containing Polymeric Matrix

The polymeric matrix prepared in examples 1-8 were used to make the corresponding LV-Samples 1, 1-Q and LV-Samples 2-8. The general procedure to make a LV device is shown hereinafter.

(1) The selected photoinitiator Irgacure 819 with pre-determined amount (0.1% unless otherwise specified) was dissolved in a polymeric matrix. The polymeric matrix for making LV-Sample 1 and 1-Q was siloxane polymeric matrix obtained in Example 1, and the polymeric matrix for making LV-Sample 2-8 were the modified POSS compounds obtained in Examples 2-8.

(2) Preparation of Light Control Particles

A 250 ml 3-neck round bottom glass flask was charged with 30.0 g of 21.2 wt % isopentyl acetate solution of nitrocellulose (¼ sec SS), 6.0 g of 12, 70.0 g of isopentyl acetate, 4.0 g of anhydrous $CaI_2$, and 4.0 g of Aeroxide® P25, and heating to 42° C. After I2 was dissolved, 6.0 g of anhydrous methanol, 0.8 g of water, and 4.0 g 2,5-PDA-$2H_2$(2,5-Pyrazinedicarboxylic acid dihydrate) was added to the three-necked round bottom flask. The flask content was stirred for 4 hours at 42° C., and then cooled naturally.

Centrifuge the reaction solution at 1350 G for 0.5 hour to remove the big particles. Centrifuge the supernatant at 18000 G for 5 hours and discard the supernatant to yield the light control particles. Then, the light control particles were further dispersed with 250 mL of isopentyl acetate, mixed well with shaking and sonication.

(3) In 250 ml round bottom glass flask was weighted 40 gram of TDTM (Tridecyl trimellitate) and the step (2). After thoroughly mixing by shaking, isopentyl acetate was subsequently removed by a rotary evaporator for 3 hours at 80° C. to yield a LV suspension containing light control particles.

(4) Mixed the substances obtained in the step (1) and step (2) in a ratio of 2:1 to yield a LV emulsion.

(5) The LV emulsion was applied onto an ITO/PET film as a 6-mil thick wet coating using a doctor blade, and then mated with a second ITO/PET film (with both ITO surfaces in contact with the emulsion) and then cured with ultraviolet radiation (6,000 mJ/cm$^3$) to yield a 4 mil thick solid LV film.

(6) The solid LV film was electrically activated using 220 Volts AC at 50 Hz, and light transmittance was recorded before and after applying the electric voltage. Each of the films made from the examples in this invention has exhibited electrochromic behavior, with the light transmittance from about 1% in the off state to about 50% in the on state.

(7) The moisture resistance and other properties are qualitatively assessed via life-time time in an environment chamber at a humidity of 95%, temperature of 60° C., and xenon radiation of 500 watt/m$^2$. Typical observations are summarized in Table-1.

TABLE 1

Typical performance of LV devices made from the examples

| LV-Sample | polymeric matrix | UV-Curability Time to cure(s) | Bonding Strength (N/m) | Moisture Resistivity (Hrs to colorless) |
|---|---|---|---|---|
| 1 | Example 1 | N/A | N/A | N/A |
| 1-Q | Example 1 | 30 | 1.8 | 216 |
| 2 | Example 2 | 30 | 2.7 | 480 |
| 3 | Example 3 | 20 | 2.8 | 528 |
| 4 | Example 4 | 15 | 2.9 | 600 |
| 5 | Example 5 | 30 | 2.8 | 504 |
| 6 | Example 6 | 20 | 2.8 | 504 |
| 7 | Example 7 | 30 | 2.8 | 480 |
| 8 | Example 8 | 30 | 2.8 | 480 |

1-Q LV sample made from polymeric matrix prepared in Example 1 but with four times amount of photoinitiator.

UV-Curability: All samples except Sample-1 made from the polymeric matrix of Example 1 based on a prior art method was reasonably solidified after different UV exposing time as shown in Table 1 above. Further test showed that the polymeric matrix of Example 1 required four times amount of photoinitiator to be properly cured, and the sample made with four times amount of photoinitiator was referred as Sample 1-Q in Table-1. Technically, it is known that larger amount of photoinitiator might cause larger amount of photoinitiator residue or by-products resulted in the decomposition of the photoinitiator inside the final LV film. Clearly as a polymeric matrix for LV device, the said modified POSS compound made according to this invention can provide better UV-curability and reduce the amount of photoinitiator usage, this in return not only reduce the cost of LV film but reduce the potential problems associated with film being cured with higher amount of photoinitiator.

Moisture resistance: The moisture resistance was indirectly evaluated from the stability test in an environmental chamber. During this test, all LV films were subjected to a high relative humidity of 95% at a temperature of 60° C. The LV Sample 1-Q which used polymeric matrix from Example 1 based on a prior art method was degraded to colorless after 216 hours exposure, while all the rest LV samples still exhibited light blue color at the same time and at least doubled the time to colorless at the test conditions as listed in Table-1. Therefore, it is evidenced that LV films with modified POSS compound of this invention improve the moisture resistivity.

Bonding Strength: The bonding strength of LV film to the substrate layer, ITO/PET in these samples herein is another important factor to check the durability of LV film, which was measured using a rheometer, STROGRAPH E-S, Toyo Seiki Seisakusho Ltd. All the LV films were tested under the conditions that peeling angle was 90°, loading weight was 50N, pulling-up speed was 50 mm/min. The bonding strength of film using the modified POSS compound, LV Sample 2-8, was about 2.8 N/m. As comparison, the bonding strength of the film for LV Sample 1-Q which used polymeric matrix from Example 1 based on a prior art method was 1.8 N/m. The results demonstrated that the LV films with modified POSS compound had a better bonding strength.

What is claimed is:

1. A light valve device being capable of electronically changing light transmittance, which has a sandwich structure comprising two transparent electroconductive substrate layers and a light control layer therebetween,
   wherein the light control layer comprises solid polymeric matrix; in the solid polymeric matrix, liquid droplets are dispersed, and inside the liquid droplets light control particles are embedded; and the solid polymeric matrix is formed by solidifying of a modified POSS compound under ultraviolet irradiation or heating,
   wherein the modified POSS compound is shown in Structure 1, POSS-(O—P)$_m$      (Structure 1)

which is synthesized via hydroxyl condensation among component I, component II and component III;
   wherein the component I is a POSS monomer having at least one hydroxyl as shown in Structure 2;

POSS-(OH)$_n$      (Structure 2)

the component II is a crosslinkable dihydroxyl-terminated silicon-containing monomer or oligomer; the component III is a dihydroxyl-terminated silicon-containing non-crosslinkable monomer or oligomer;
   P is a linear chain formed by a number of the component II and a number of the component III, wherein the number of the component II is j, and the number of the component III is k;
   j is an integer from 1 to 20, k is an integer from 1 to 50, n is an integer from 1 to 12, and m is an integer from 1 to 12;
   the component I has a structure selected from the group consisting of Structure 3, Structure 4, Structure 5 and Structure 6,

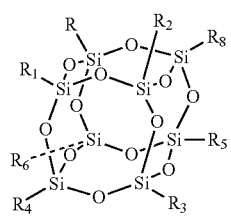
(Structure 3)

wherein $R_1$ to $R_8$ are substituents independently selected from halogen atoms, saturated or unsaturated hydrocarbons, and at least one of $R_1$ to $R_8$ is a hydroxyl;

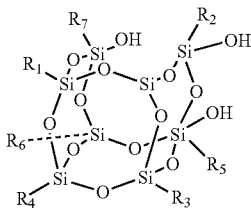
(Structure 4)

wherein $R_1$ to $R_7$ are substituents independently selected from hydroxyl, halogen atoms, saturated or unsaturated hydrocarbons;

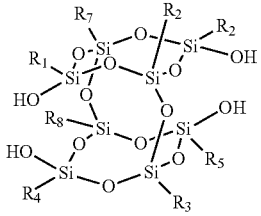
(Structure 5)

wherein $R_1$ to $R_8$ are substituents independently selected from hydroxyl, halogen atoms, saturated or unsaturated hydrocarbons;

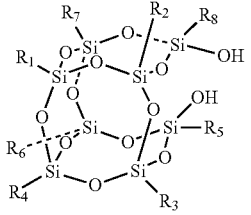
(Structure 6)

wherein $R_1$ to $R_8$ are substituents independently selected from hydroxyl, halogen atoms, saturated or unsaturated hydrocarbons.

2. The light valve device according to claim 1, wherein the component II has a structure of

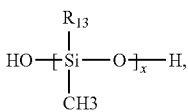

and $R_{13}$ is crosslinkable substituent selected from alkenyl groups, and x is an integer from 1 to 10.

3. The light valve device according to claim 1, wherein the component III has a structure of

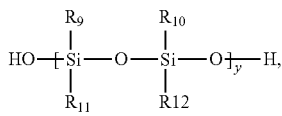

and

R$_9$ to R$_{12}$ are non-crosslinkable substituents independently selected from alkyl groups and aryl groups, and y is an integer from 1 to 10.

4. The light valve device according to claim 1, wherein the modified POSS compound is a liquid compound at room temperature.

5. The light valve device according to claim 1, wherein the transparent electroconductive substrate layer is selected from the group consisting of ITO glass, ITO/PET film, sliver nanowire/PET film and copper nanowire/PET film.

6. A modified POSS compound as shown in Structure 1,

POSS-(O—P)$_m$ (Structure 1)

which is synthesized via hydroxyl condensation among component I, component II and component III;

wherein the component I is a POSS monomer having at least one hydroxyl as shown in Structure 2;

POSS-(OH)$_n$ (Structure 2)

the component II is a crosslinkable dihydroxyl-terminated silicon-containing monomer or oligomer; the component III is a dihydroxyl-terminated silicon-containing non-crosslinkable monomer or oligomer;

P is a linear chain formed by a number of the component II and a number of the component III, wherein the number of the component II is j, and the number of the component III is k;

j is an integer from 1 to 20, k is an integer from 1 to 50, n is an integer from 1 to 12, and m is an integer from 1 to 12;

the component I has a structure selected from the group consisting of Structure 3, Structure 4, Structure 5 and Structure 6,

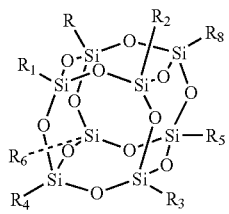

(Structure 3)

wherein R$_1$ to R$_8$ are substituents independently selected from halogen atoms, saturated or unsaturated hydrocarbons, and at least one of R$_1$ to R$_8$ is a hydroxyl;

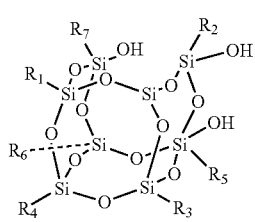

(Structure 4)

wherein R$_1$ to R$_7$ are substituents independently selected from hydroxyl, halogen atoms, saturated or unsaturated hydrocarbons;

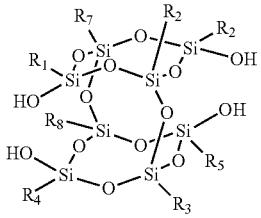

(Structure 5)

wherein R$_1$ to R$_8$ are substituents independently selected from hydroxyl, halogen atoms, saturated or unsaturated hydrocarbons;

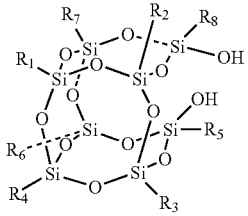

(Structure 6)

wherein R$_1$ to R$_8$ are substituents independently selected from hydroxyl, halogen atoms, saturated or unsaturated hydrocarbons.

7. The modified POSS compound according to claim 6, wherein
the component II has a structure of

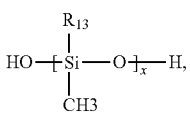

and

R$_{13}$ is crosslinkable substituents selected from alkenyl groups, and x is an integer from 1 to 10.

8. The modified POSS compound according to claim 6, wherein the component III has a structure of

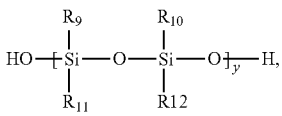

and

R$_9$ to R$_{12}$ are non-crosslinkable substituents independently selected from alkyl groups and aryl groups, and y is an integer from 1 to 10.

9. The modified POSS compound according to claim 6, wherein the modified POSS compound is a liquid compound at room temperature.

* * * * *